United States Patent
Rundo

(10) Patent No.: US 12,173,815 B2
(45) Date of Patent: Dec. 24, 2024

(54) COUPLING UNIT FOR FLUID ELEMENT

(71) Applicant: Woodster Capital, Ltd., Chardon, OH (US)

(72) Inventor: Mark Rundo, Washington, DC (US)

(73) Assignee: WOODSTER CAPITAL, LTD., Chardon, OH (US)

( * ) Notice: Subject to any disclaimer, the term of this patent is extended or adjusted under 35 U.S.C. 154(b) by 0 days.

(21) Appl. No.: 17/712,883

(22) Filed: Apr. 4, 2022

(65) Prior Publication Data
US 2023/0313918 A1 Oct. 5, 2023

(51) Int. Cl.
| | |
|---|---|
| F04B 53/10 | (2006.01) |
| F04B 53/16 | (2006.01) |
| F16L 15/00 | (2006.01) |
| F16L 37/407 | (2006.01) |

(52) U.S. Cl.
CPC ........ F16L 15/006 (2013.01); F04B 53/1015 (2013.01); F04B 53/16 (2013.01); F16L 37/407 (2013.01)

(58) Field of Classification Search
CPC ....... F16L 15/006; F16L 37/407; F16L 39/00; F16L 39/02; F16L 39/06; F16L 41/08; F16L 41/086; F16L 41/12; F16L 41/14; F16L 47/28; F16L 47/30

USPC ...... 285/120.1, 124.1, 124.4, 201, 203, 208, 285/219; 222/145.5, 145.6, 145.7; 366/181.5, 182.4, 339

See application file for complete search history.

(56) References Cited

U.S. PATENT DOCUMENTS

| | | | | |
|---|---|---|---|---|
| 3,305,249 | A | * 2/1967 | Zahuranec | F16L 39/00 285/379 |
| 3,842,870 | A | * 10/1974 | Burgess | B01J 47/02 285/305 |
| 4,538,920 | A | 9/1985 | Drake | |
| 5,053,202 | A | 10/1991 | Dwyer et al. | |
| 8,075,302 | B1 | * 12/2011 | McClellan | B29B 7/7447 366/159.1 |
| 9,174,234 | B2 | 11/2015 | Snowwhite et al. | |
| 10,625,293 | B2 | 4/2020 | Frey | |
| 2011/0225988 | A1 | * 9/2011 | Baust | F16L 13/103 62/50.7 |
| 2012/0156371 | A1 | * 6/2012 | Snowwhite | B05C 5/0279 427/207.1 |

* cited by examiner

*Primary Examiner* — Aaron M Dunwoody
(74) *Attorney, Agent, or Firm* — Pearne & Gordon LLP

(57) ABSTRACT

A coupling unit for a fluid element includes a monolithic body having a head and a threaded portion extending from the head, the threaded portion including a core and a thread formed on the core. The monolithic body defines a first bore and a second bore that extend through the monolithic body substantially parallel to each other, the first and second bores each having a circular cross-section.

16 Claims, 16 Drawing Sheets

COUPLING UNIT FOR FLUID ELEMENT

TECHNICAL FIELD

This application relates generally to a coupling unit for a fluid element and, more specifically, to a coupling unit for a static mixer of a fluid applicator.

BACKGROUND

An applicator can be used to apply adhesive or other fluids along a surface. There are a number of circumstances where such an applicator can be advantageously employed. For example, the construction of roofs for commercial and industrial buildings, typically, involves, as a first step, installing a corrugated steel decking having alternating peaks, or ribs, and valleys, or flutes. Thereafter, one or more layers of an insulating material are placed over the decking. Finally, one or more layers of a waterproof covering are placed over the insulating material. Conventionally, adhesives are used to secure the steel decking and the various layers of roofing materials together to form a, more-or-less, unitary covering for the roof. Thus, it can be desirable to have an applicator that can apply one or more beads of adhesive along the roof in a single pass.

In some examples, it may be desirable to have an applicator that applies a two-part adhesive formed by mixing two adhesive reactants. Such applicators typically have multiple fluid elements that are assembled together to form a fluid system that conveys the two reactants from separate containers to a common element (e.g., static mixer), which then mixes the reactants and discharges the mixed mass for application onto a surface. For the purposes of this disclosure, a "fluid element" refers to a tube, static mixer, or any other element that is configured to convey, deliver, and/or receive one or more fluids. Such fluid elements can be fluidly coupled using conventional means such as quick-connect fittings, threaded pipe fittings, flanges, etc.

BRIEF SUMMARY OF THE INVENTION

The following presents a simplified summary of example embodiments of the invention. This summary is not intended to identify critical elements or to delineate the scope of the invention.

In accordance with a first aspect, a coupling unit for a fluid element includes a monolithic body having a head and a threaded portion extending from the head, the threaded portion including a core and a thread formed on the core. The monolithic body defines a first bore and a second bore that extend through the monolithic body substantially parallel to each other, the first and second bores each having a circular cross-section.

In accordance with a second aspect, an applicator system includes a frame; a first tube; a second tube; a static mixer having a tubular housing and a plurality of static mixing blades fixed within the tubular housing; and a coupling unit coupling the static mixer to the frame, the coupling unit having a monolithic body that includes a head and a threaded portion extending from the head, the threaded portion being threadably coupled to an inlet portion of the tubular housing. The monolithic body defines a first bore and a second bore that extend through the monolithic body substantially parallel to each other, the first and second bores each having a circular cross-section. Moreover, the first and second tubes are respectively inserted within the first and second bores.

BRIEF DESCRIPTION OF THE DRAWINGS

The above and other features, aspects, and advantages of the present application are better understood when the following detailed description of the present application is read with reference to the accompanying drawings, in which.

DETAILED DESCRIPTION

The following is a detailed description of illustrative embodiments of the present application. As these embodiments of the present application are described with reference to the aforementioned drawings, various modifications or adaptations of the methods and or specific structures described may become apparent to those skilled in the art. All such modifications, adaptations, or variations that rely upon the teachings of the present application, and through which these teachings have advanced the art, are considered to be within the spirit and scope of the present application. Hence, these descriptions and drawings are not to be considered in a limiting sense as it is understood that the present application is in no way limited to the embodiments illustrated. Moreover, certain terminology is used herein for convenience only and is not to be taken as a limitation.

Figure 1:
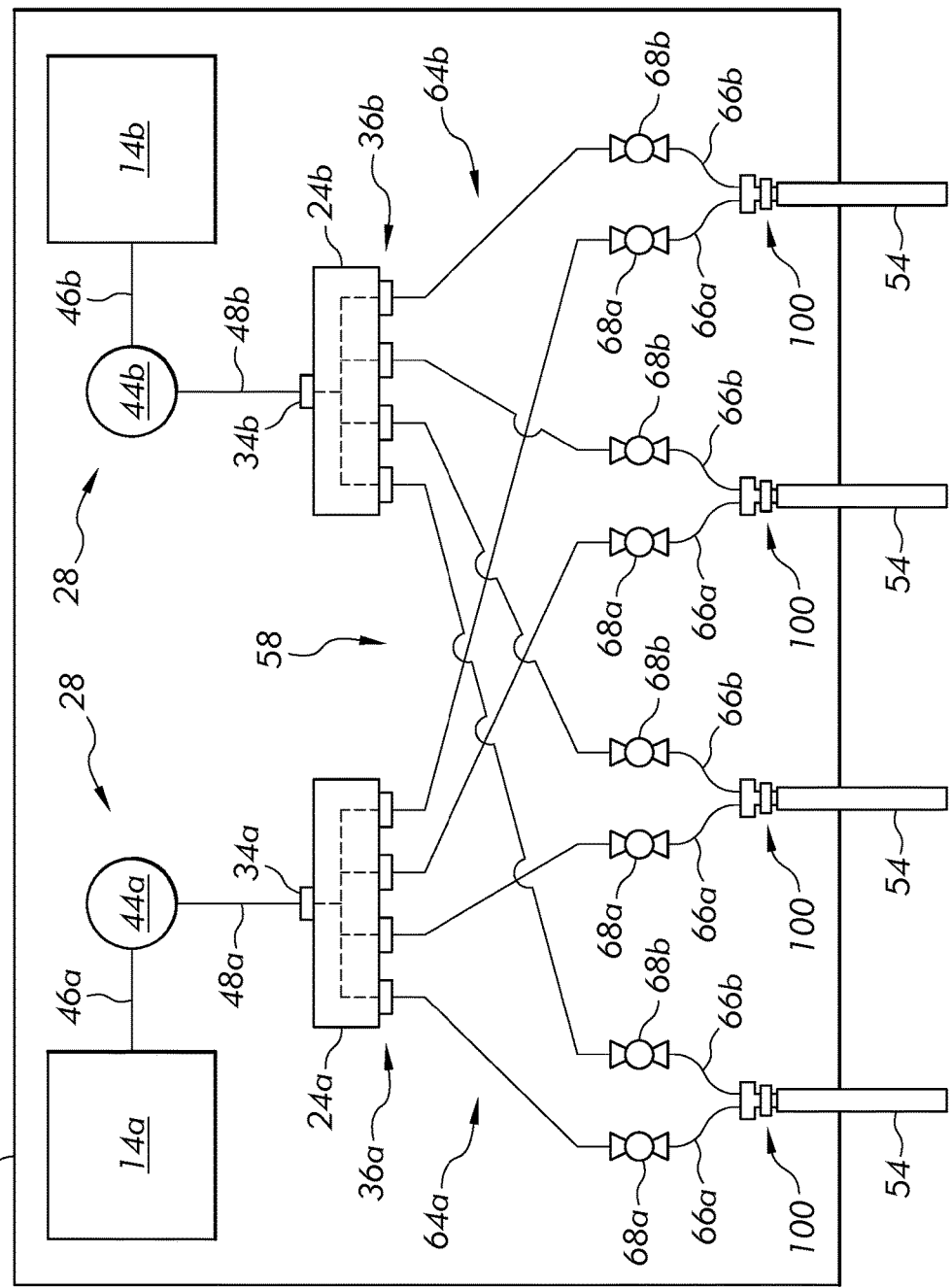
FIG. 1 is a schematic view of an example applicator.

An example applicator system 10 is schematically illustrated in FIG. 1 for applying adhesive and/or other fluids along a surface. The system 10 includes first and second containers 14a, 14b that respectively contain first and second fluids. The fluids can comprise a variety of different substances such as, for example, adhesives, lubricants, paints, etc. In some examples, the fluid in the first container 14a can comprise a first part of a two-part adhesive and the fluid in the second container 14b can comprise a second part of the two-part adhesive. However, the fluids can comprise any type of fluid. Moreover, the fluids can be different from each other in some embodiments or substantially identical to each other in other embodiments.

The system 10 further includes first and second manifolds 24a, 24b and a conveyance system 28 that is selectively operable to move the fluids from the containers 14a, 14b to the manifolds 24a, 24b. More specifically, each manifold 24a, 24b has an inlet 34a, 34b and a plurality of outlets 36a, 36b that are in fluid communication with the inlet 34a, 34b. Meanwhile, the conveyance system 28 includes first and second pumps 44a, 44b, wherein the first pump 44a is fluidly coupled between the first container 14a and first manifold 24a via a first set of tubes 46a, 48a, and the second pump 44b is fluidly coupled between the second container 14b and second manifold 24b via a second set of tubes 46b, 48b.

The first pump 44a can be operated to draw fluid from the first container 14a via the tube 46a and deliver the fluid to the inlet 34a of the first manifold 24a via the tube 48a, and the second pump 44b can be operated to draw fluid from the second container 14b via the tube 46b and deliver the fluid to the inlet 34b of the second manifold 24b via the tube 48b. The fluids will then flow through the manifolds 24a, 24b and be distributed to their respective outlets 36a, 36b.

It is to be appreciated that the conveyance system 28 can comprise a variety of other configurations for delivering fluid from the containers 14a, 14b to the manifolds 24a, 24b. For example, the conveyance system 28 can comprise a hydraulic press with one or more pistons that are operable to compress the containers 14a, 14b and force their fluids thereout into discharge tubes that deliver the fluids to the manifolds 24a, 24b. Generally speaking, the conveyance system 28 can comprise any means that are operable for conveying fluid from the containers 14a, 14b to the manifolds 24a, 24b.

The system 10 further includes a plurality of nozzles 54 and a tubing assembly 58 for conveying fluid from each outlet 36a, 36b of the manifolds 24a, 24b to a respective nozzle 54. In particular, the tubing assembly 58 includes a first set of tubes 64a, 66a and ball valves 68a for conveying fluid from each outlet 36a of the first manifold 24a to a respective nozzle 54, and a second set of tubes 64b, 66b and ball valves 68b for conveying fluid from each outlet 36b of the second manifold 24b to a respective nozzle 54.

For example, each outlet 36a of the first manifold 24a is fluidly coupled to a respective nozzle 54 by a first tube 64a, a second tube 66a, and a ball valve 68a. The first tube 64a fluidly couples the outlet 36a of the manifold 24a to an inlet of the ball valve 68a, and the second tube 66a fluidly couples an outlet of the ball valve 68a to the nozzle 54. Likewise, each outlet 36b of the second manifold 24b is fluidly coupled to a respective nozzle 54 by a first tube 64b, a second tube 66b, and a ball valve 68b. The first tube 64b fluidly couples the outlet 36b of the manifold 24b to an inlet of the ball valve 68b, and the second tube 66b fluidly couples an outlet of the ball valve 68b to the nozzle 54.

The ball valves 68a, 68b are operable to provide selective communication between each outlet 36a, 36b of the manifolds 24a, 24b with their respective nozzle 54. When the ball valves 68a, 68b are all opened, each outlet 36a, 36b of the manifolds 24a, 24b will be in fluid communication with its respective nozzle 54 via its associated tubes 64a, 64b, 66a, 66b and ball valve 68a, 68a. Conversely, when the ball valves 68a, 68b are all closed, the outlets 36a, 36b of the manifolds 24a, 24b will not be in fluid communication with their associated tubes 66a, 66b and nozzles 54. In some examples, the ball valves 68a, 68b can each be independently operable to provide selective communication between their respective outlet 36a, 36b and nozzle 54. In other examples, one or more ball valves 68a, 68b can be operatively coupled together such that they can be actuated simultaneously between open and closed states.

The tubing assembly 58 can thus deliver fluids from both manifolds 24a, 24b to each nozzle 54. However, it is to be appreciated that the tubing assembly 58 can comprise other configurations for delivering the fluids to each nozzle 54 without departing form the scope of the disclosure. For instance, each outlet 36a, 36b of the manifolds 24a, 24b can be fluidly coupled to its associated nozzle 54 by a single tube without any intermediate ball valve.

Figure 2:
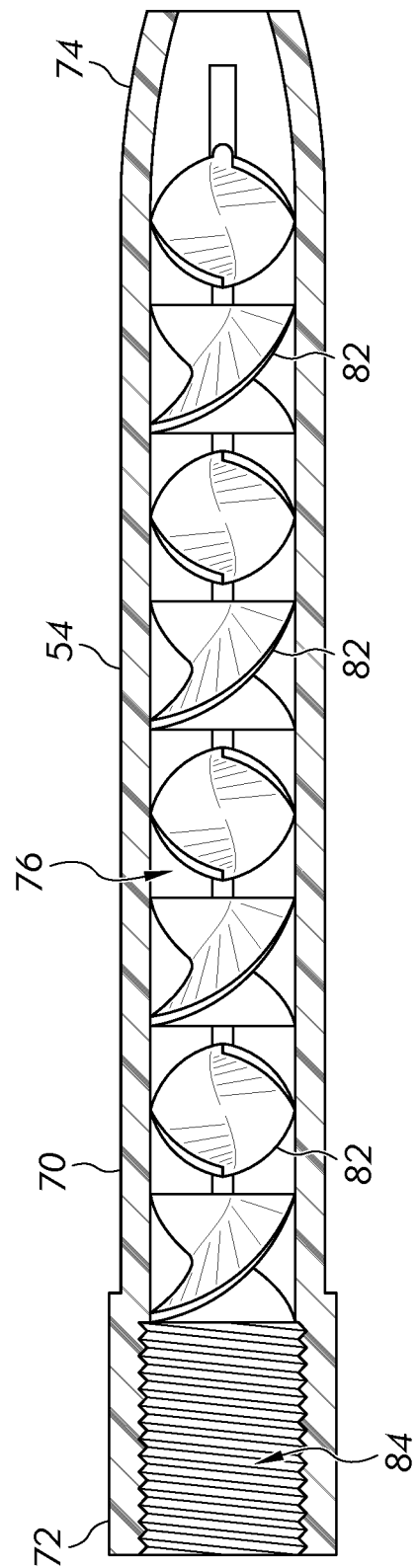
FIG. 2 is a partial cross-section view of a nozzle of the applicator.

The nozzles 54 are static mixers that are configured to mix the fluids delivered thereto and then dispense the mixed fluids onto a surface. In particular, as shown in FIG. 2, each nozzle 54 comprises a tubular housing 70 having an inlet portion 72, an outlet portion 74, and a mixing channel 76 that extends therethrough from the inlet portion 72 to the outlet portion 74. Moreover, each nozzle 54 comprises a plurality of static mixing blades 82 that are fixed to the tubular housing 70 within its mixing channel 76. Furthermore, the inlet portion 72 of each nozzle 54 has a female thread 84 formed on its inner surface such that the inlet portion 72 can threadably receive a coupling unit (described further below) for coupling the nozzle 54 to its associated tubes 66a, 66b.

The fluids delivered to each nozzle 54 will enter the mixing channel 76 via the inlet portion 72 and then flow through the mixing channel 76 toward the outlet portion 74. As the fluids flow through the channel 76, the static mixing blades 82 will mix the fluids together to form a homogenous mass. The mixed fluids will then exit the nozzle 54 via the outlet portion 74 for dispensing onto a surface.

The specific configuration of each nozzle 54 can vary by embodiment. Generally speaking, each nozzle 54 can comprise any body having an inlet portion for receiving two separate fluids and an outlet portion for discharging the combined fluids, wherein the inlet portion is internally threaded for engagement with the coupling unit described further below. Specific example static mixing nozzles are disclosed in U.S. Pat. Nos. 4,538,920 and 5,053,202, the contents of which are incorporated herein by reference in their entirety. Although the inlet portions illustrated in these references are not internally threaded, it is appreciated that their inlet portions can be modified accordingly.

Referring back to FIG. 1, the system 10 can further include a frame 90 for supporting one or more of the elements described above. For instance, the containers 14a, 14b, manifolds 24a, 24b, conveyance system 28, tubing assembly 58, and nozzles 54 can all be supported by and optionally fixed to the frame 90 using conventional means of attaching two structures together (e.g., fasteners, mounting brackets, adhesive, etc.). In particular, the containers 14a, 14b, pumps 44a, 44b, manifolds 24a, 24b, ball valves 68a, 68*b*, and nozzles 54 can be fixed to the frame 90, while the tubes 46*a*, 46*b*, 48*a*, 48*b*, 64*a*, 64*b*, 66*a*, 66*b* can depend from these fixed elements.

However, one or more elements described above can simply be supported by the frame 90 without fixing them thereto. Moreover, in some examples, one or more elements can be located remote from the frame 90 such as, for example, the containers 14*a*, 14*b* and pumps 44*a*, 44*b*.

The frame 90 can comprise any rigid structure for supporting elements of the system 10. In some examples, the frame 90 can be a cart with a plurality of wheels that can be pushed or pulled to move its supported elements. One example cart is disclosed in U.S. Pat. No. 9,174,234, the contents of which are incorporated herein by reference in their entirety. In other examples, the frame 90 can be a wand, rod, or some other rigid instrument that can be held by a user and manipulated to move its supported elements.

The containers 14*a*, 14*b*, manifolds 24*a*, 24*b*, conveyance system 28, tubing assembly 58, and nozzles 54 of the system 10 can be fluidly coupled together as described above using conventional means of fluidly coupling different elements (e.g., quick-connect fittings, threaded pipe fittings, flanges, etc.). Moreover, each element can be coupled to the frame 90 using conventional means of attaching two structures together (e.g., fasteners, mounting brackets, adhesive, etc.). However, new coupling units will now be described that can be implemented to attach each nozzle 54 to the frame 90 and fluidly couple the nozzle 54 to its associated tubes 66*a*, 66*b*.

Figure 3:
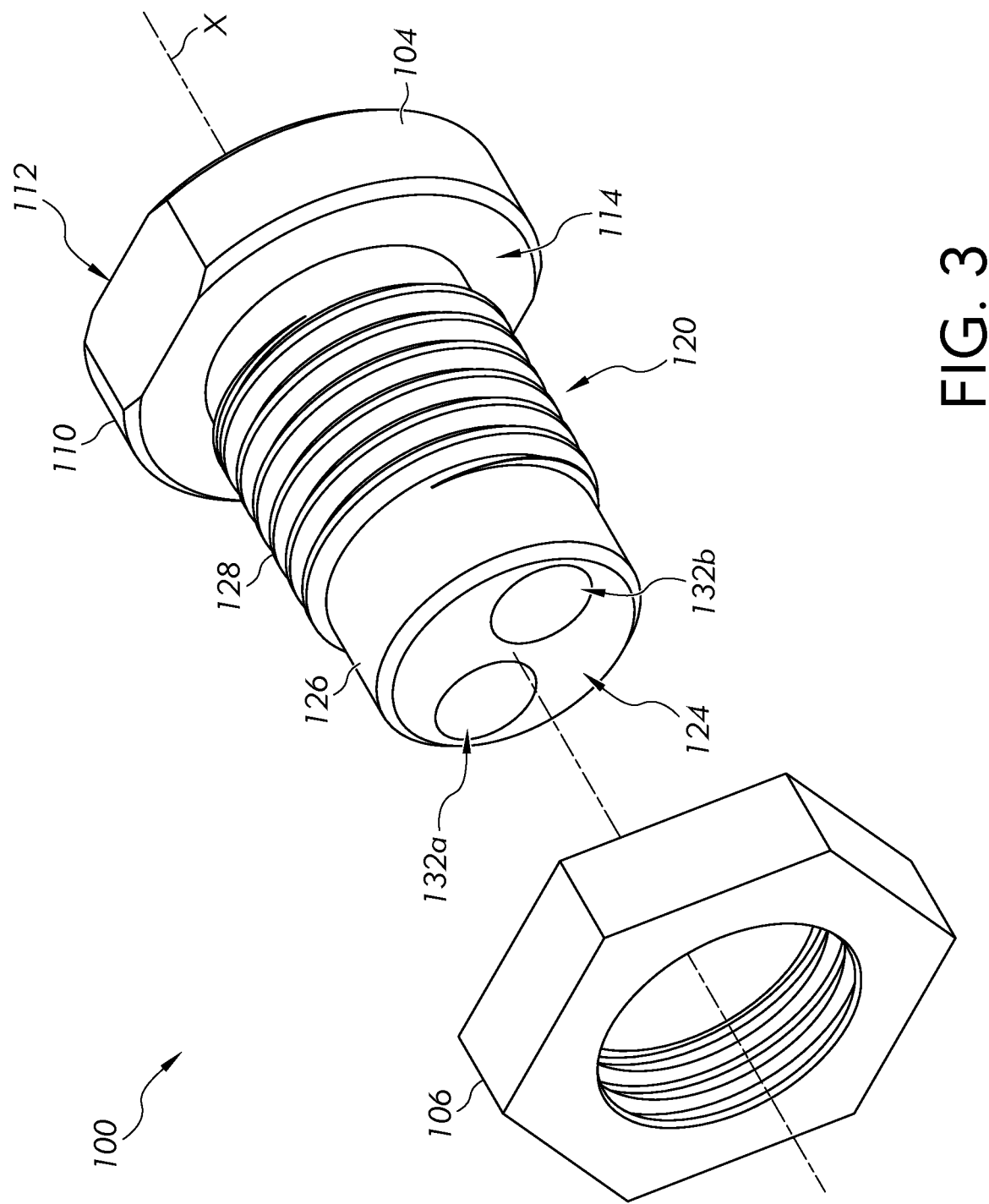
FIG. 3 is an exploded view of a first example coupling unit of the applicator.
Figure 4:
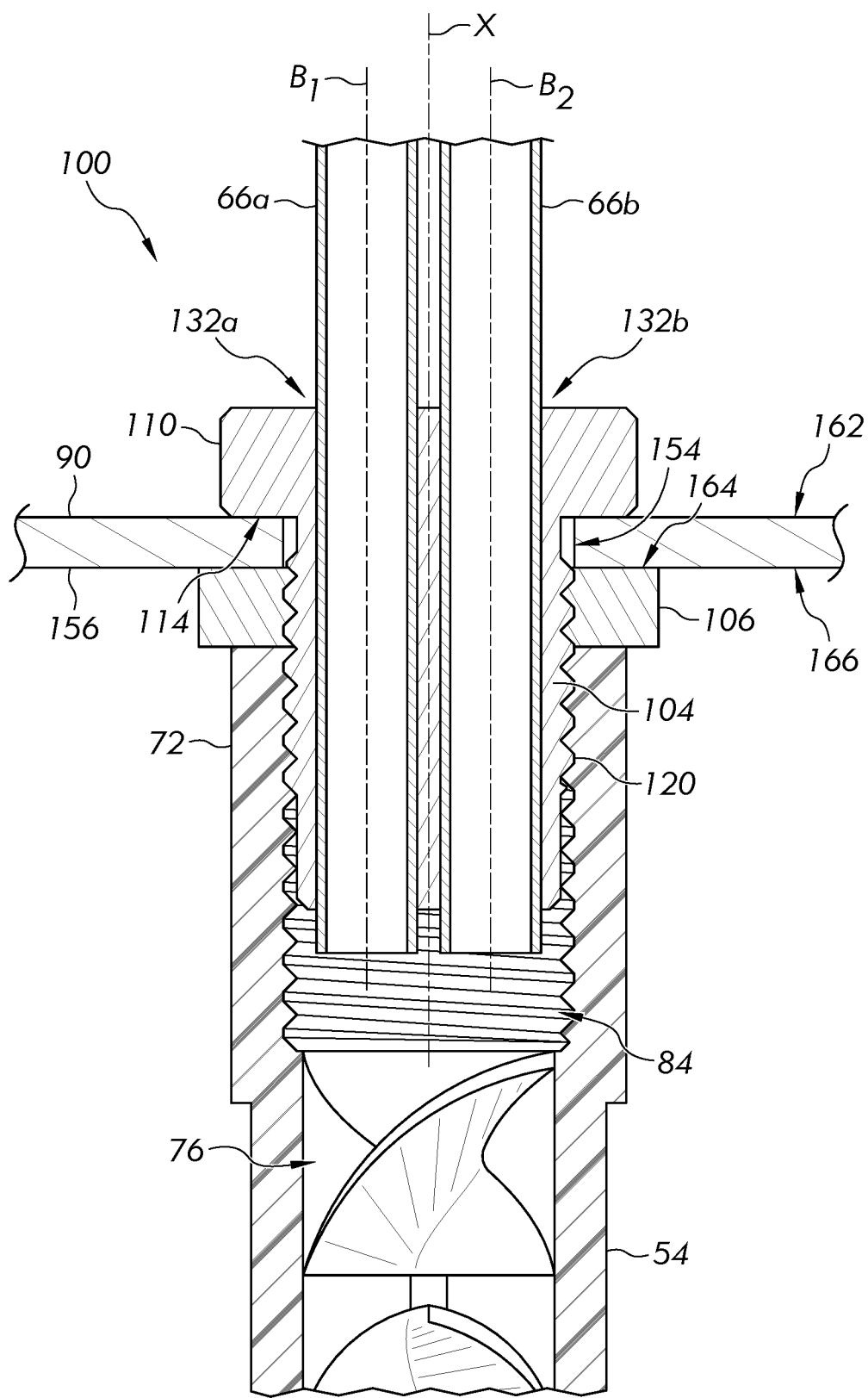
FIG. 4 is an enlarged cross-section view of the first coupling unit assembled with the nozzle and a frame of the applicator.
Figure 5:
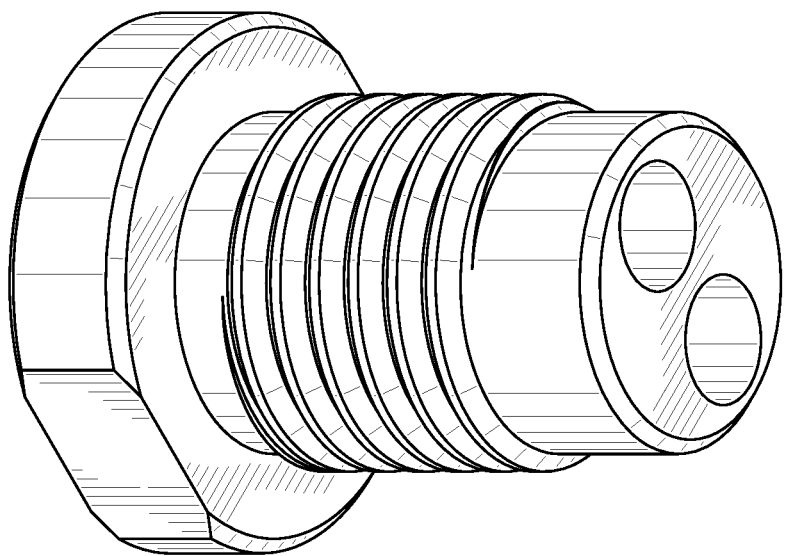
FIG. 5 is perspective view of a body of the first coupling unit.
Figure 7:
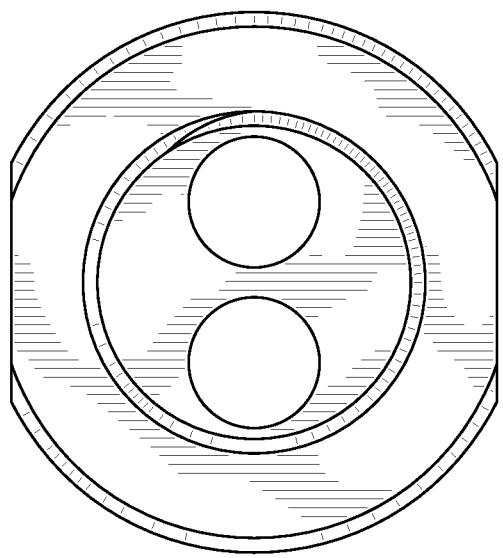
FIG. 7 is bottom view of the body of the first coupling unit.
Figure 6:
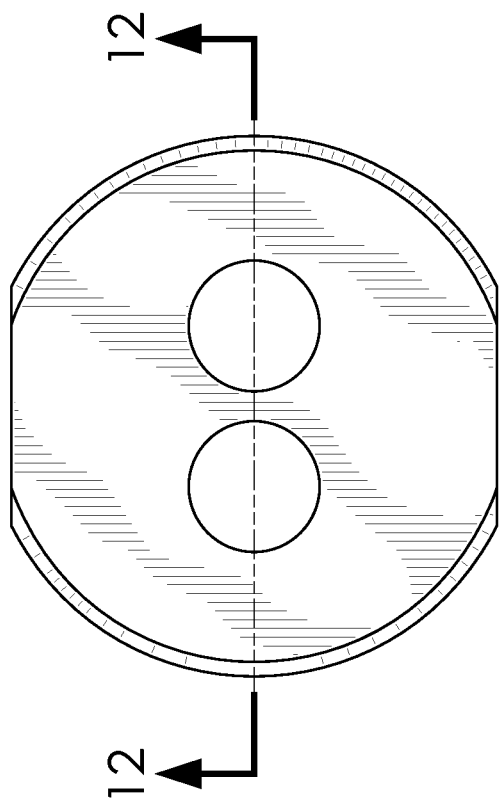
FIG. 6 is a top view of the body of the first coupling unit.
Figure 9:
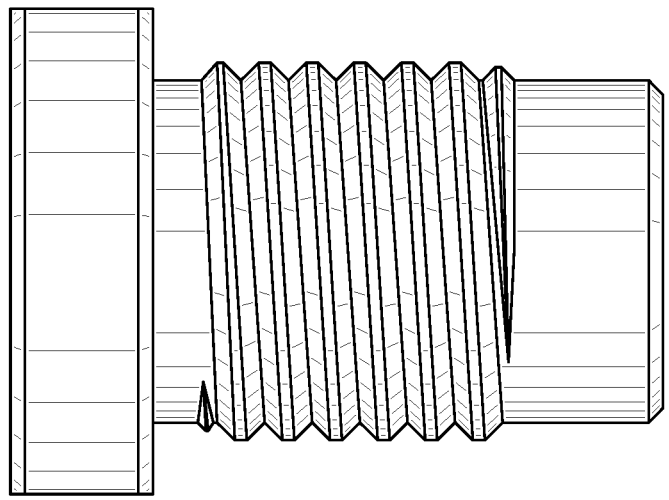
FIG. 9 is a right-side view of the body of the first coupling unit.
Figure 8:
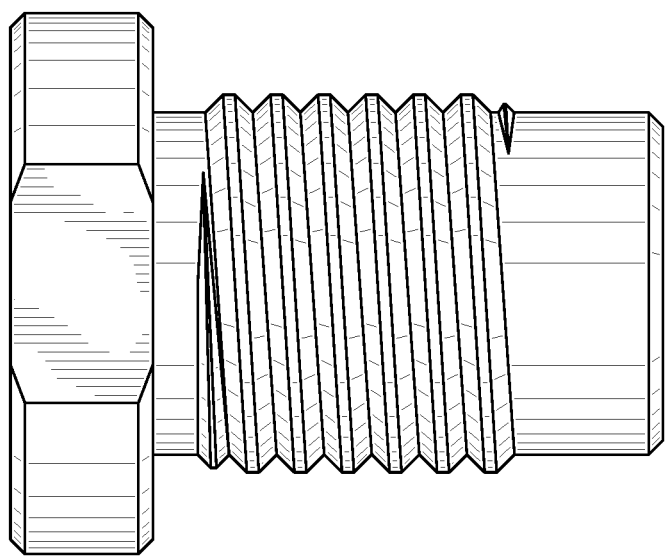
FIG. 8 is a front view of the body of the first coupling unit.
Figure 11:
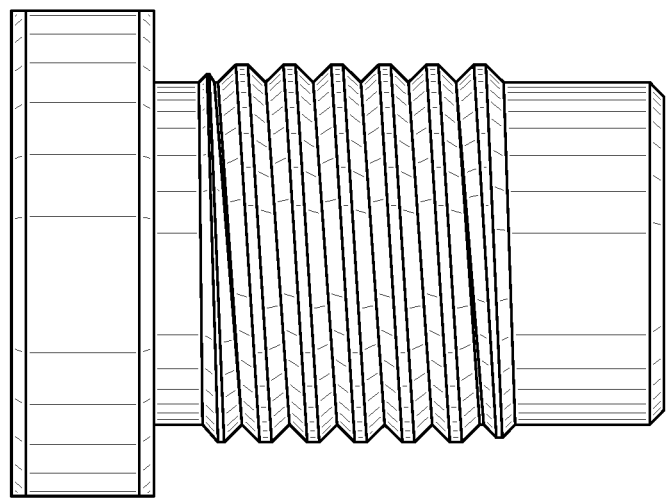
FIG. 11 is a left-side view of the body of the first coupling unit.
Figure 10:
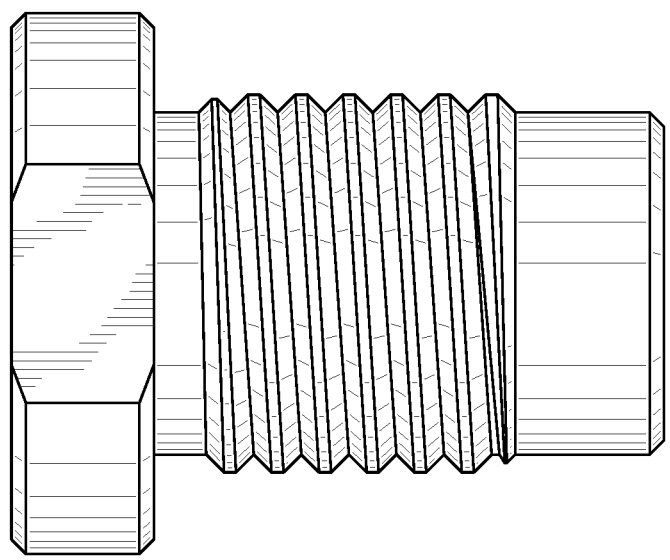
FIG. 10 is a rear view of the body of the first coupling unit.
Figure 12:
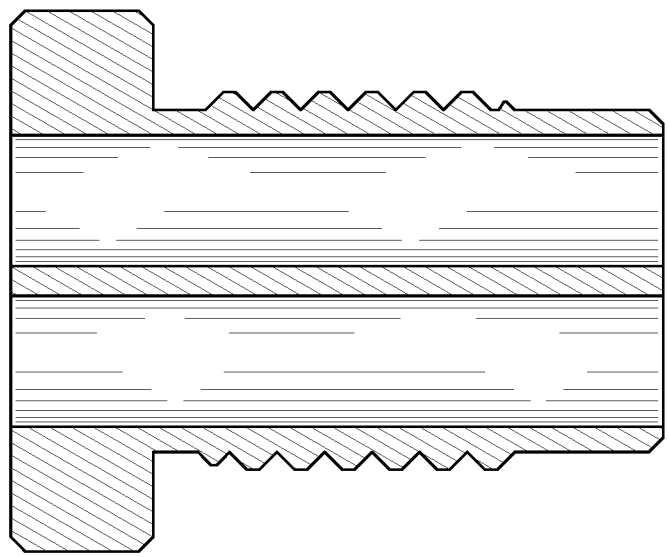
FIG. 12 is a cross-section view of the body of the first coupling unit taken along the line 12-12 in FIG. 6.

FIG. 3 shows an exploded view of a first example coupling unit 100, which includes a body 104 and a nut 106. FIG. 4 shows an enlarged cross-section view of the coupling unit 100 assembled with the frame 90, a nozzle 54, and the nozzle's associated tubes 66*a*, 66*b*. Moreover, FIGS. 5-12 show detailed illustrations of the body 104. It is to be appreciated that each nozzle 54 of the system 10 can be coupled to the frame 90 and its associated tubes 66*a*, 66*b* using its own respective coupling unit 100.

As shown in FIGS. 3 and 4, the body 104 of the coupling unit 100 is monolithic and defines a longitudinal axis X extending through its center in a longitudinal direction of the body 104. The axis X defines axial and radial directions of the body 104, axial directions being parallel with the axis X and radial directions being perpendicular to and intersecting with the axis X.

The body 104 includes a head 110 having an upper surface 112 and a lower surface 114, and a threaded portion 120 extending axially from the lower surface 114 of the head 110 (it is to be appreciated that directional orientations such as "upper" and "lower" as used herein for the body 104 and other elements of the system 10 are for ease of description only, and the corresponding features may have other orientations depending on their ultimate arrangement). The upper surface 112 of the head 110 defines an upper end of the body 104, while a lower surface 124 of the threaded portion 120 defines a lower end of the body 104. Moreover, the head 110 and its lower surface 114 are wider than the threaded portion 120 (the widths being measured in a direction perpendicular to and intersecting with the axis X)

The threaded portion 120 has a core 126 and a male thread 128 that extends around the core 126 in multiple revolutions. The body 104 of the coupling unit 100 can thus be threadably coupled to the nozzle 54 by inserting its threaded portion 120 into the inlet portion 72 of the nozzle 54 and threadably engaging the male thread 128 of the threaded portion with the female thread 84 of the inlet portion 72.

The body 104 further defines first and second bores 132*a*, 132*b* extending through the body 104 from its upper end to its lower end. The bores 132*a*, 132*b* have central axes $B_1$, $B_2$ that are substantially parallel to each other and the longitudinal axis X of the body 102 (as used herein, the phrase "substantially parallel" is intended to denote configurations that are within about 5° of parallel, preferably within about 3° of parallel, and more preferably within about 1° of parallel). Moreover, the bores 132*a*, 132*b* are each circular in cross-section (their cross-section being taken along a plane perpendicular to their respective axis $B_1$, $B_2$).

The tubes 66*a*, 66*b* associated with the nozzle 54 can be coupled to the body 104 and nozzle 54 by inserting them within the bores 132*a*, 132*b* of the body 104. Moreover, the bores 132*a*, 132*b* and tubes 66*a*, 66*b* can be sized to establish an interference fit between the body 104 and tubes 66*a*, 66*b* when inserted in the bores 132*a*, 132*b*. For example, the outer diameter of each tube 66*a*, 66*b* can be greater in size than the inner diameter of its associated bore 132*a*, 132*b* such that a difference between the two diameters is ¹⁄₁₆ inches or less, and in some cases ¹⁄₃₂ inches or less. However, other relative sizes are possible in different embodiments. Moreover, in some examples, the outer diameter of each tube 66*a*, 66*b* can be equal to or smaller than the inner diameter of its associated bore 132*a*, 132*b*. In such cases, a sealant can be applied to the tubes 66*a*, 66*b* and/or bores 132*a*, 132*b* to seal any gaps therebetween and help secure the tubes 66*a*, 66*b* within the bores 132*a*, 132*b*.

In this manner, the tubes 66*a*, 66*b* can be securely and easily coupled to the body 104 and nozzle 54 without the need for complex and expensive fittings. Moreover, because the bores 132*a*, 132*b* extend substantially parallel to each other, the width of the threaded portion 120 can be minimized such that the threaded portion 120 and tubes 66*a*, 66*b* can be received within the inlet portion 72 of the nozzle 54. Preferably, the tubes 66*a*, 66*b* will extend completely through the bores 132*a*, 132*b* into the mixing channel 76 of the nozzle 54. This will prevent any fluid passing through the tubes 66*a*, 66*b* from contacting and possibly adhering to the side walls of the bores 132*a*, 132*b*, thus preventing the need to periodically clean or replace the body 104. However, the tubes 66*a*, 66*b* may only extend partially through the bores 132*a*, 134*b* in some examples.

The body 104 is monolithic and comprises a solid body of material such as aluminum, steel, stainless steel, brass, copper, wood, PVC, polyethylene, polypropylene, polycarbonate, phenolic, ABS, styrene, PTFE, acetal, ABS, nylon, polyoxymethylene, polyethylene terephthalate, HDPE, LDPE, UHMW, polyphenylene, urethane, or silicone. Moreover, the body 104 can be formed by machining a slug of its base material, or by molding the body 104 using a process such as casting or injection molding.

The tubes 66*a*, 66*b* preferably comprise a compressible material such as rubber or some other plastic that can enable the tubes 66*a*, 66*b* to be inserted within the bores 132*a*, 134*b* of slightly smaller size. However, the tubes 66*a*, 66*b* can comprise harder materials in other examples, particularly if they are smaller in size than the 132*a*, 134*b* or if the body 104 is formed of a soft material that can deform to accommodate the tubes 66*a*, 66*b* within the bores 132*a*, 134*b*.

The nut 106 of the coupling body 100 can be used for securing the coupling unit 100 (and nozzle 54 coupled thereto) to the frame 90. More specifically, before the body 104 is threadably coupled to the nozzle 54, its threaded portion 120 can be inserted through an aperture 154 in a panel 156 (e.g., bracket, wall, etc.) of the frame 90, such that its head 110 is located on an upper side of the panel 156 and the threaded portion 120 extends below a lower side of the panel 156. The nut 106 can then be threaded onto the threaded portion 120 of the body 104 until the panel 156 is sandwiched (i.e., compressed) between the head 110 and nut 106.

In particular, the lower surface 114 of the head 110 will contact and press against an upper surface 162 of the panel 156, while an upper surface 164 of the nut 106 will contact and press against a lower surface 166 of the panel 156. The coupling unit 100 as assembled will thus be secured to the panel 156, and the nozzle 54 can then be threadably coupled to the body 104 to also secure it to the panel 156.

The nut 106 is preferably a hex-nut that can be threaded onto the body 104 using a conventional wrench. However, the nut 106 may comprise other types of nuts in different examples, and can be threaded onto the body 104 by hand or using other means. Moreover, the coupling unit 100 in some examples may exclude the nut 106 and simply comprise the body 104. In such examples, the body 104 and nozzle 54 can be secured to the panel 156 by first inserting the threaded portion 120 of the body 104 through the panel's aperture 154 and then threading the nozzle 54 onto the threaded portion 120 of the body 104 until the panel 156 is sandwiched (i.e., compressed) between the head 110 and nozzle 54. Still further, the coupling unit 100 (and nozzle 54 attached thereto) can be coupled to the frame 90 using other means such as welding or conventional fasteners.

Figure 13:
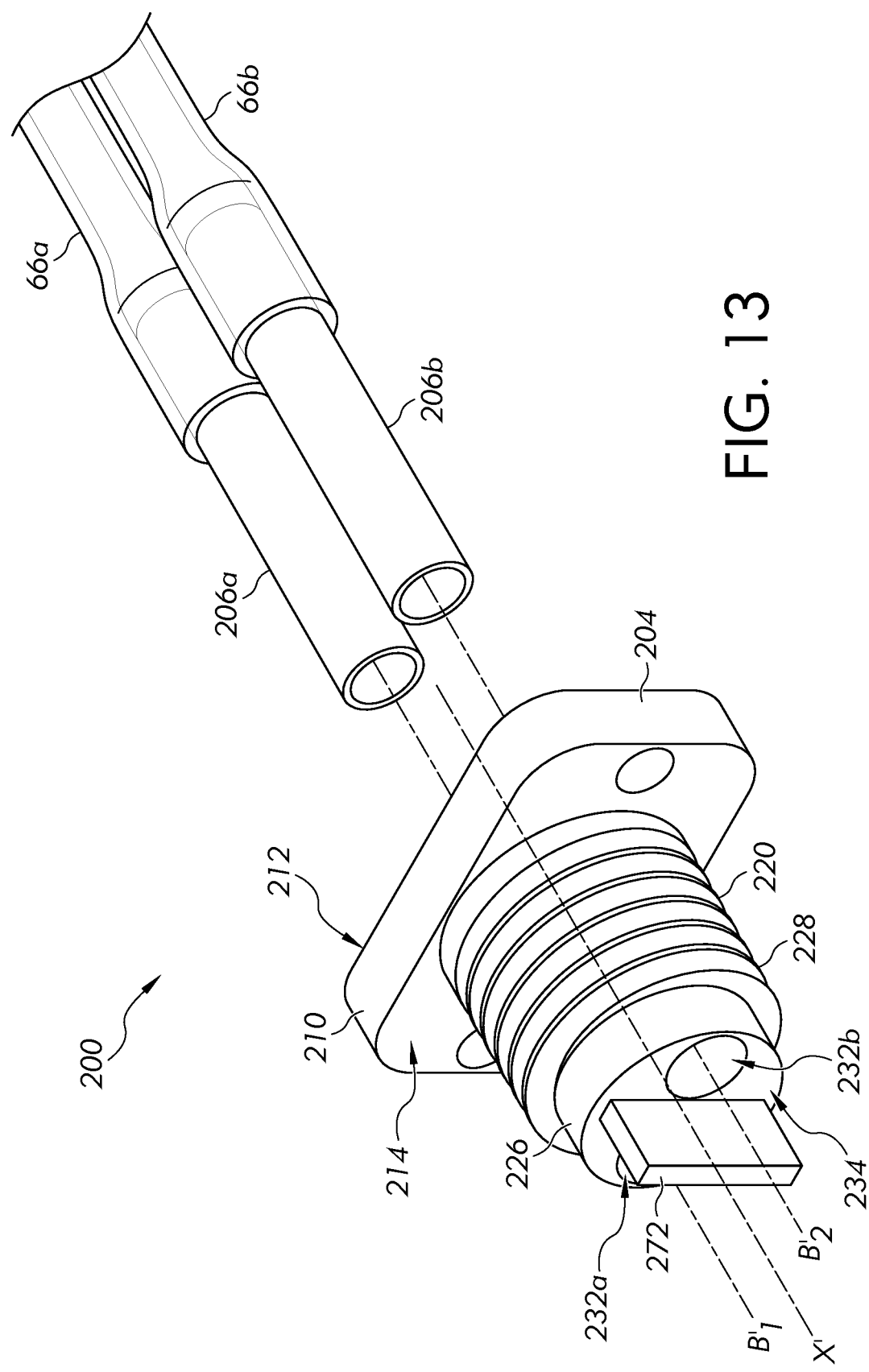
FIG. 13 is an exploded view of a second example coupling unit of the applicator.
Figure 14:
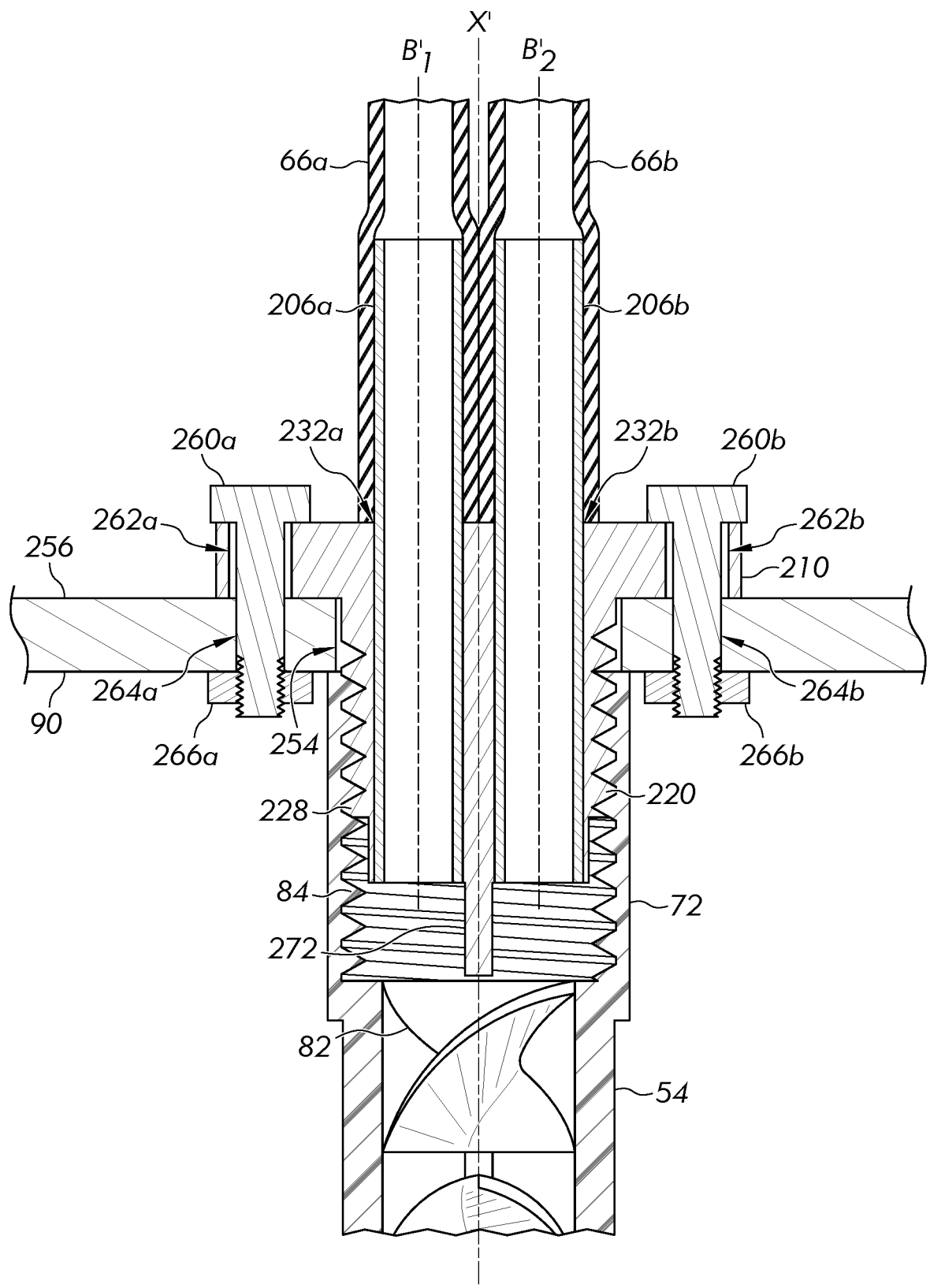
FIG. 14 is an enlarged cross-section view of the second coupling unit assembled with the nozzle and a frame of the applicator.
Figure 15:
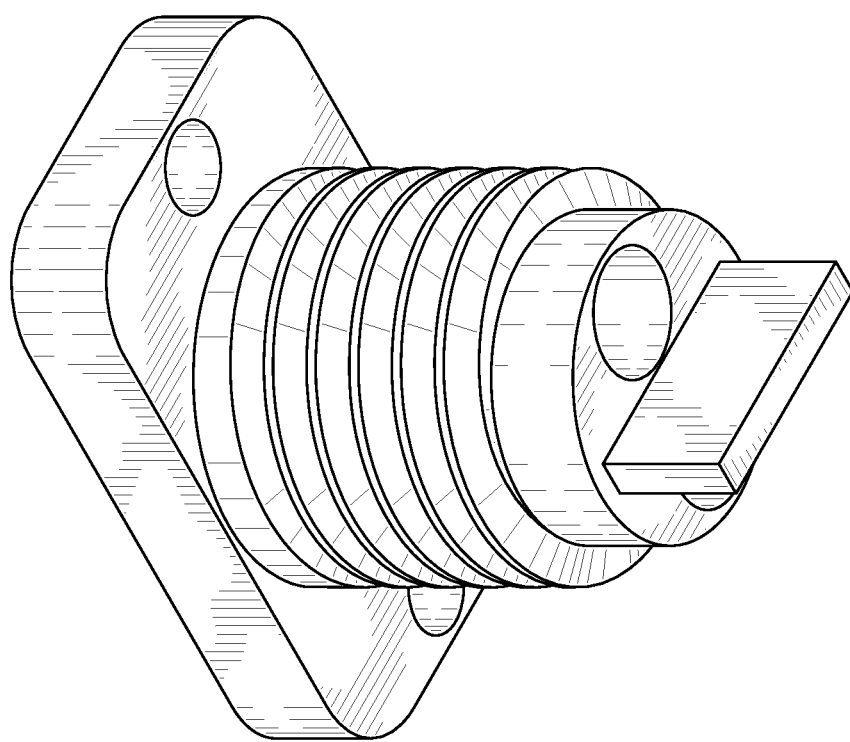
FIG. 15 is perspective view of a body of the second coupling unit.
Figure 17:
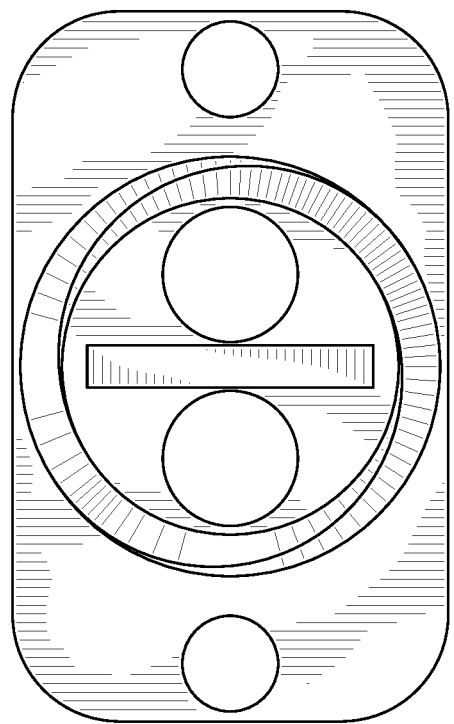
FIG. 17 is bottom view of the body of the second coupling unit.
Figure 16:
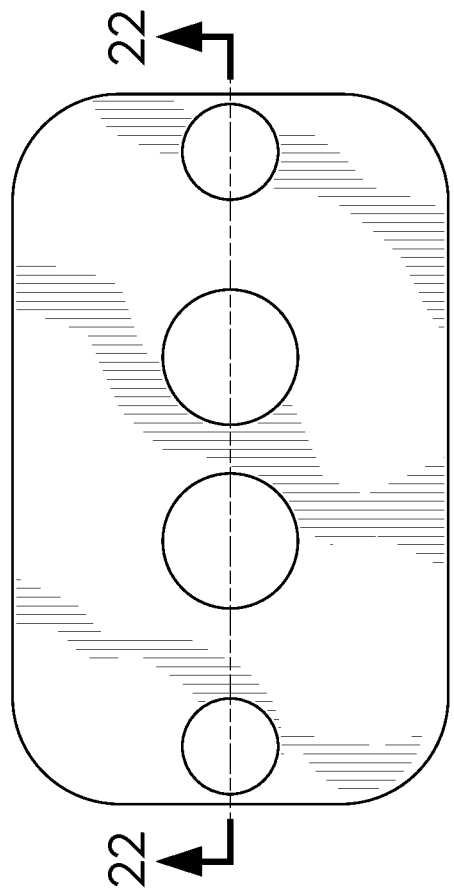
FIG. 16 is a top view of the body of the second coupling unit.
Figure 19:
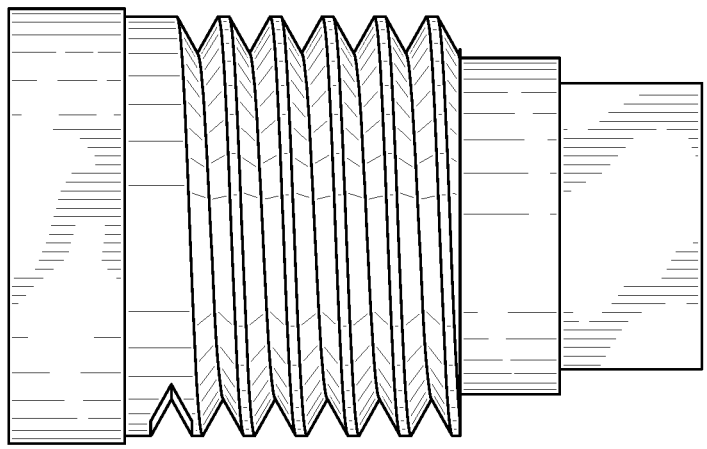
FIG. 19 is a right-side view of the body of the second coupling unit.
Figure 18:
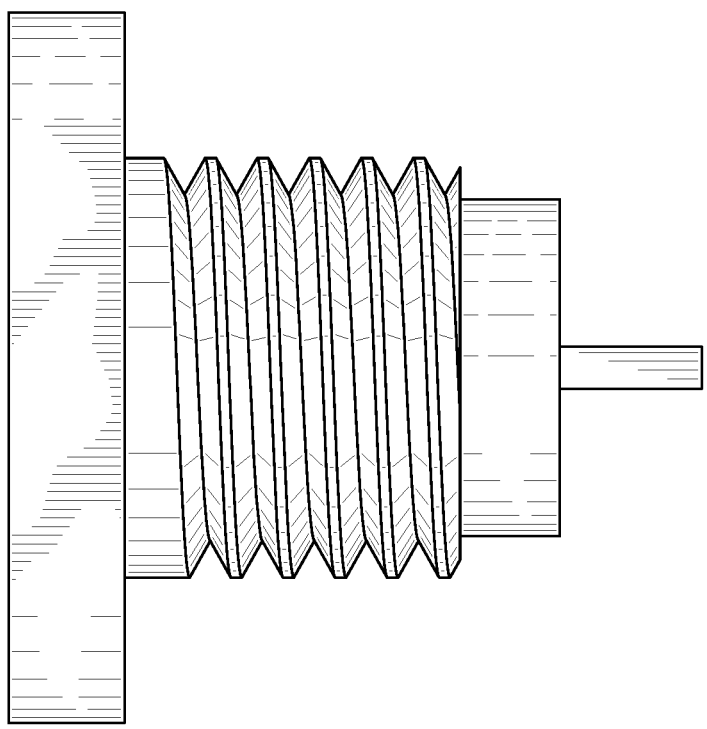
FIG. 18 is a front view of the body of the second coupling unit.
Figure 21:
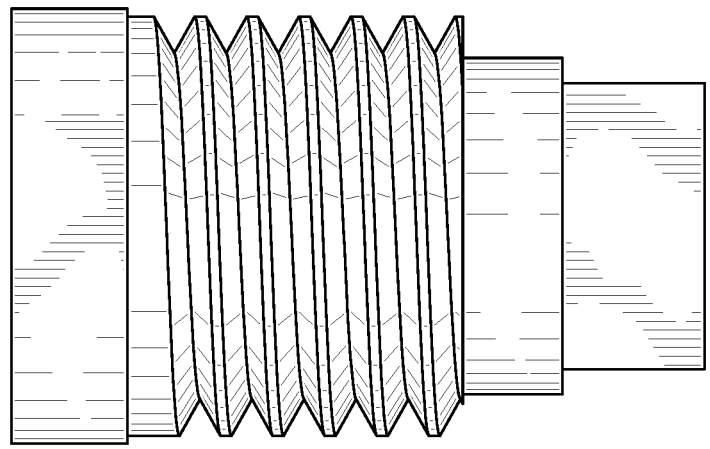
FIG. 21 is a left-side view of the body of the second coupling unit.
Figure 20:
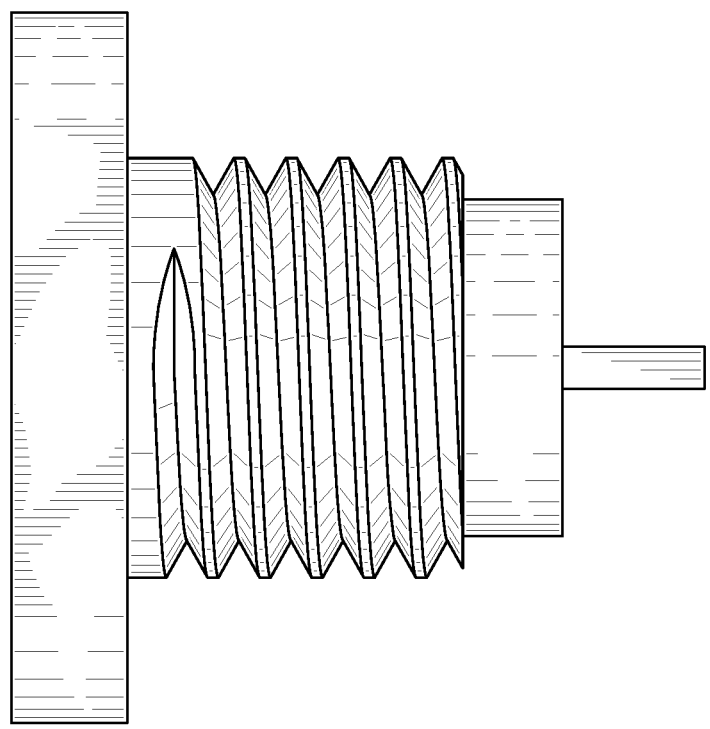
FIG. 20 is a rear view of the body of the second coupling unit.
Figure 22:
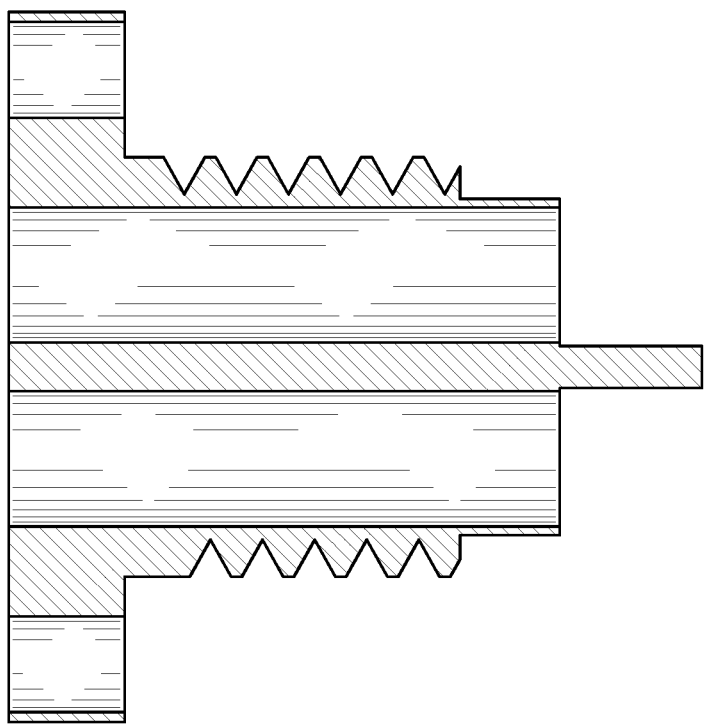
FIG. 22 is a cross-section view of the body of the second coupling unit taken along the line 22-22 in FIG. 16.

Turning to FIGS. 13-22, another example coupling unit 200 will now be described, which includes a body 204 and a pair of adapter tubes 206a, 206b. FIG. 13 shows an exploded view of the coupling unit 200, and FIG. 14 shows an enlarged cross-section view of the coupling unit 200 assembled with the frame 90, a nozzle 54, and the nozzle's associated tubes 66a, 66b. Moreover, FIGS. 15-22 show detailed illustrations of the body 204. It is to be appreciated that each nozzle 54 of the system 20 can be coupled to the frame 90 and its associated tubes 66a, 66b using its own respective coupling unit 200.

As shown in FIG. 13, the body 204 of the coupling unit 200 is monolithic and defines a longitudinal axis X' extending through its center in a longitudinal direction of the body 204. The axis X' defines axial and radial directions of the body 204, axial directions being parallel with the axis X' and radial directions being perpendicular to and intersecting with the axis X'.

The body 204 includes a head 210 having an upper surface 212 and a lower surface 214, and a threaded portion 220 extending axially from the lower surface 214 of the head 210 (it is to be appreciated that directional orientations such as "upper" and "lower" as used herein for the body 204 and other elements of the coupling unit 200 are for ease of description only, and the corresponding features may have other orientations depending on their ultimate arrangement). The head 210 and its lower surface 214 are wider than the threaded portion 220 (the widths being measured in a direction perpendicular to and intersecting with the axis X')

The threaded portion 220 has a core 226 and a male thread 228 that extends around the core 226 in multiple revolutions. The body 204 of the coupling unit 200 can thus be threadably coupled to the nozzle 54 by inserting its threaded portion 220 into the inlet portion 72 of the nozzle 54 and threadably engaging the male thread 228 of the threaded portion 220 with the female thread 84 of the inlet portion 72 (see FIG. 14).

The body 204 further defines first and second bores 232a, 232b extending through the body 204 from the upper surface 212 of the head 210 to a bottom surface 234 of the core 226. The bores 232a, 232b have central axes $B'_1$, $B'_2$ that are substantially parallel to each other and the longitudinal axis X' of the body 202. Moreover, the bores 232a, 232b are each circular in cross-section (their cross-section being taken along a plane perpendicular to their respective axis $B'_1$, $B'_2$).

The tubes 66a, 66b associated with the nozzle 54 can be coupled to the body 204 and nozzle 54 by inserting upper ends of the adapter tubes 206a, 206b into the tubes 66a, 66b, and then inserting lower ends of the adapter tubes 206a, 206b into the bores 232a, 232b of the body 204. Moreover, the adapter tubes 206a, 206b can be sized to establish an interference fit with the body 204 and tubes 66a, 66b when inserted therein. For example, the outer diameter of each adapter tube 206a, 206b can be greater in size than the inner diameters of its associated tube 66a, 66b and bore 232a, 232b such that a difference between the outer diameter and each inner diameter is 2/16 inches or less, and in some cases 2/32 inches or less. However, other relative sizes are possible in different embodiments. Moreover, in some examples, the outer diameter of each adapter tube 206a, 206b can be equal to or smaller than the inner diameters of its associated tube 66a, 66b and bore 232a, 232b. In such cases, a sealant can be applied between each adapter tube 206a, 206b and its associated tube 66a, 66b and bore 232a, 232b to seal any gaps therebetween and help secure the elements together.

In this manner, the tubes 66a, 66b can be securely and easily coupled to the body 204 and nozzle 54 without the need for complex and expensive fittings. Moreover, because the bores 232a, 232b extend substantially parallel to each other, the width of the threaded portion 220 can be minimized such that the threaded portion 220 and tubes 66a, 66b can be received within the inlet portion 72 of the nozzle 54. Preferably, the adapter tubes 206a, 206b will extend completely through the bores 232a, 232b to at least their bottom ends. This will prevent any fluid passing through the adapter tubes 206a, 206b from contacting and possibly adhering to the side walls of the bores 232a, 232b, thus preventing the need to periodically clean or replace the body 204. However, the adapter tubes 206a, 206b may only extend partially through the bores 232a, 234b in some examples.

The body 204 is monolithic and comprises a solid body of material such as aluminum, steel, stainless steel, brass, copper, wood, PVC, polyethylene, polypropylene, polycarbonate, phenolic, ABS, styrene, PTFE, acetal, ABS, nylon, polyoxymethylene, polyethylene terephthalate, HDPE, LDPE, UHMW, polyphenylene, urethane, or silicone. Moreover, the body 204 can be formed by machining a slug of its base material, or by molding the body 204 using a process such as casting or injection molding.

The tubes 66a, 66b preferably comprise an expandable material such as rubber or some other plastic that can enable the tubes 66a, 66b to accommodate the adapter tubes 206a, 206b of slightly greater size. Moreover, the adapter tubes 206a, 206b preferably comprise a material (e.g., brass) that is softer than the material of the body 204 such that the tubes 206a, 206b will compress slightly when inserted within the bores 232a, 234b of slightly smaller size. However, the tubes 66a, 66b, 206a, 206b can comprise harder materials in other examples.

Before the body 204 is threadably coupled to the nozzle 54, its threaded portion 220 can be inserted through an aperture 254 (see FIG. 14) in a panel 256 (e.g., bracket, wall, etc.) of the frame 90, such that its head 210 is located on an upper side of the panel 256 and the threaded portion 220 extends below a lower side of the panel 256. A pair of threaded fasteners 260a, 260b can then be inserted through associated apertures 262a, 262b, 264a, 264b in the body 204 and panel 256, and a pair of nuts 266a, 266b can be threaded onto the fasteners 260a, 260b to secure the body 204 to the panel 256. The nozzle 54 can then be threadably coupled to the body 204 to also secure it to the panel 256.

The body 204 further includes a divider plate 272 that extends axially from the bottom surface 234 of the core 226. In particular, the divider plate 272 extends substantially parallel to the longitudinal axis X' of the body 202 and between the central axes $B'_1$, $B'_2$ of the bores 232a, 232b. Moreover, the divider plate 272 is centrally arranged such that it evenly partitions the bottom surface 234 of the core 226 and is located on the longitudinal axis X' of the body 202. The divider plate 272 has a width (measured perpendicular to the longitudinal axis X') that is substantially similar to a diameter of the bottom surface 234 of the core 226, such that a ratio of the two dimensions is about 0.80 or greater, and preferably about 0.90 or greater, and still more preferably about 0.95 of greater.

The divider plate 272 as configured can partition an inner chamber of the nozzle's inlet portion 72 such that two fluids exiting the adapter tubes 206a, 206b can remain mostly separated until they are closer to the mixing blades 82 of the nozzle 54. This keeps the fluids evenly distributed as they reach the mixing blades 82, such that an even mixture can be produced and discharged from the outlet portion 74 of the nozzle 54.

The coupling units 100, 200 as described above can thus be useful for fluidly coupling the two tubes 66a, 66b to the static mixing nozzle 54, and securing those elements to panel 256 of the frame 90. However, it is to be appreciated that the coupling units 100, 200 can be used for coupling other fluid elements together. For instance, the coupling units 100, 200 could be used for coupling two tubes to an inlet portion of a distribution manifold or some other fluid element.

Moreover, it is to be appreciated that the coupling units 100, 200 described above are merely examples, and that other modifications of the coupling units 100, 200 are possible without departing from the scope of this disclosure. For example, the coupling unit 100 may adopt the adapter tubes 206a, 206b and/or the divider plater 272 of the coupling unit 200 in some embodiments. As another example, the coupling unit 200 may exclude the adapter tubes 206a, 206b is some embodiments, and the tubes 66a, 66b may be fed directly into the bores 232a, 232b of the coupling body 204.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. An applicator system comprising:
a first tube;
a second tube;
a coupling unit comprising a monolithic body that includes:
a head; and
a threaded portion extending from the head, the threaded portion including a core and a thread formed on the core,
wherein the threaded portion defines a first bore and a second bore that extend through the core of the threaded portion, substantially parallel to each other, the first and second bores each having a circular cross-section, and
wherein the threaded portion has a lower surface and the head has an upper surface, the lower surface and the upper surface facing opposite directions, wherein the first and second bores extend substantially parallel to each other from the lower surface to the upper surface,
a static mixer having:
a tubular housing comprising an inlet portion and an outlet portion, the inlet portion being threadably coupled to the threaded portion of the coupling unit, and
a plurality of static mixing blades fixed within the tubular housing;
a first manifold having a first inlet and a plurality of first outlets in fluid communication with the first inlet; and
a second manifold having a second inlet and a plurality of second outlets in fluid communication with the second inlet,
wherein one of the first outlets is fluidly coupled to the first bore of the coupling unit via the first fluid tube, and
wherein one of the second outlets is fluidly coupled to the second bore of the coupling unit via the second fluid tube.

2. The applicator system according to claim 1, further comprising a nut that is threadably couplable to the threaded portion of the monolithic body.

3. The applicator system according to claim 1, wherein the monolithic body further defines a first aperture and a second aperture extending through the head.

4. The applicator system according to claim 1, wherein the monolithic body further includes a partition plate extending from a surface of the core.

5. The applicator system according to claim 1, wherein the first and second fluid tubes are respectively inserted within the first and second bores.

6. The applicator system according to claim 5, wherein the first and second fluid tubes respectively extend through the first and second bores.

7. The applicator system according to claim 1, wherein the coupling unit further comprises a first adapter tube and a second adapter tube, the first adapter tube having one end inserted into the first bore and another end inserted into the first fluid tube, the second adapter tube having one end inserted into the second bore and another end inserted into the second fluid tube.

8. The applicator system according to claim 1, further comprising:
a first ball valve fluidly coupled to the first bore of the coupling unit via the first fluid tube; and
a second ball valve fluidly coupled to the second bore of the coupling unit via the second fluid tube.

9. The applicator system according to claim 8, wherein:
the first ball valve is fluidly coupled to the one of the first outlets via a third fluid tube, and
the second ball valve is fluidly coupled to the one of the second outlets via a fourth fluid tube.

10. The applicator system according to claim 1, further comprising:
a first container containing a first fluid;
a second container containing a second fluid; and
a conveyance system that is selectively operable to move the first fluid from the first container to the first inlet of the first manifold and the second fluid from the second container to the second inlet of the second manifold.

11. The applicator system according to claim 10, wherein the conveyance system comprises a first pump that is fluidly coupled between the first container and the first inlet of the first manifold, and a second pump that is fluidly coupled between the second container and the second inlet of the second manifold.

12. The applicator system according to claim 1, wherein the first and second bores each extend straight from the lower surface to the upper surface.

13. An applicator system comprising:
a first tube;
a second tube;
a coupling unit comprising a monolithic body that includes:
  a head, and
  a threaded portion extending from the head, the threaded portion including a core and a thread formed on the core,
  wherein the monolithic body defines a first bore and a second bore that extend through the monolithic body substantially parallel to each other, the first and second bores each having a circular cross-section;
a first adapter tube having one end inserted into the first bore and another end inserted into the first tube;
a second adapter tube having one end inserted into the second bore and another end inserted into the second fluid tube;
a static mixer having:
  a tubular housing comprising an inlet portion and an outlet portion, the inlet portion being threadably coupled to the threaded portion of the coupling unit, and
  a plurality of static mixing blades fixed within the tubular housing; and
a frame, wherein the coupling unit couples the static mixer to the frame.

14. The applicator system according to claim 13, wherein the frame comprises a panel that defines an aperture, the threaded portion of the monolithic body extending through the aperture such that the head is located on a first side of the panel, and the static mixer is located on a second side of the panel such that the panel is sandwiched between the nut and head.

15. An applicator system comprising:
a frame;
a first fluid tube;
a second fluid tube;
a static mixer having a tubular housing and a plurality of static mixing blades fixed within the tubular housing; and
a coupling unit coupling the static mixer to the frame, the coupling unit comprising a monolithic body that includes a head and a threaded portion extending from the head, the threaded portion including a core and a thread formed on the core, the threaded portion being threadably coupled to an inlet portion of the tubular housing,
wherein the threaded portion defines a first bore and a second bore that extend through the core of the threaded portion substantially parallel to each other, the first and second bores each having a circular cross-section,
wherein the first and second tubes are respectively fluidly coupled to the first and second bores,
wherein the threaded potion has a lower surface and the head has an upper surface, the lower surface and the upper surface facing opposite directions, wherein the first and second bores extend substantially parallel to each other from the lower surface to the upper surface, and
wherein the first and second fluid tubes are respectively inserted within the first and second bores.

16. An applicator system comprising:
a frame;
a first fluid tube;
a second fluid tube;
a static mixer having a tubular housing and a plurality of static mixing blades fixed within the tubular housing; and
a coupling unit coupling the static mixer to the frame, the coupling unit comprising a monolithic body that includes a head and a threaded portion extending from the head, the threaded portion including a core and a thread formed on the core, the threaded portion being threadably coupled to an inlet portion of the tubular housing,
wherein the threaded portion defines a first bore and a second bore that extend through the core of the threaded portion substantially parallel to each other, the first and second bores each having a circular cross-section,
wherein the first and second tubes are respectively fluidly coupled to the first and second bores,
wherein the threaded potion has a lower surface and the head has an upper surface, the lower surface and the upper surface facing opposite directions, wherein the first and second bores extend substantially parallel to each other from the lower surface to the upper surface, and
wherein the coupling unit further comprises a first adapter tube and a second adapter tube, the first adapter tube having one end inserted into the first bore and another end inserted into the first fluid tube, the second adapter tube having one end inserted into the second bore and another end inserted into the second fluid tube.

* * * * *